Dec. 1, 1925.
F. SIEVERN
ANTISKID DEVICE
Filed July 2, 1925
1,563,666
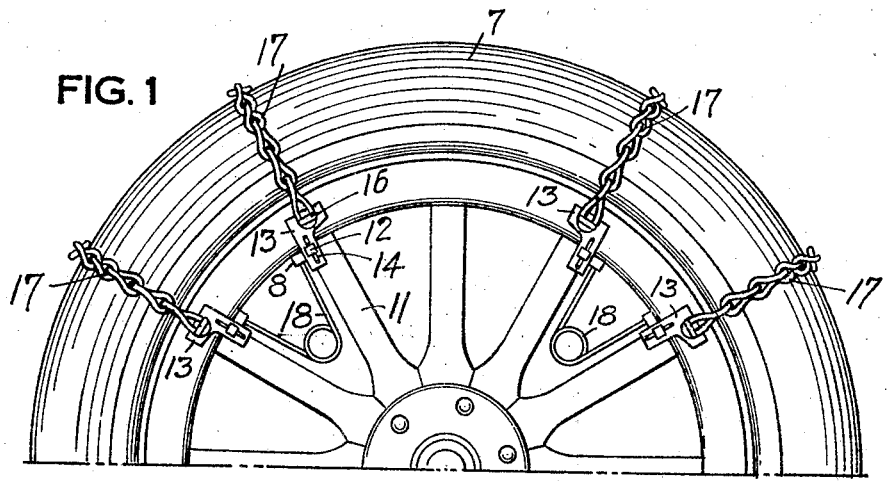
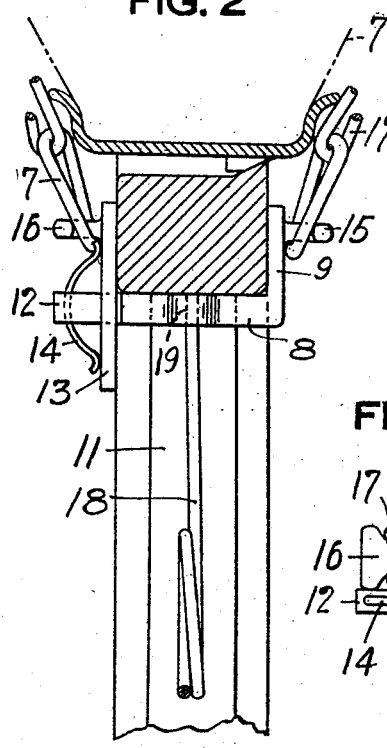
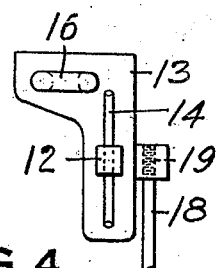
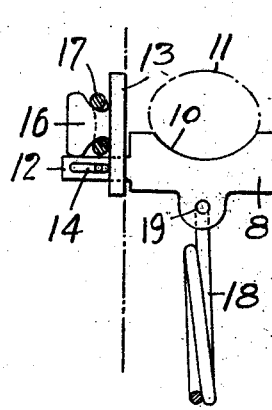
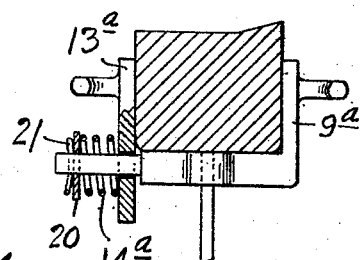
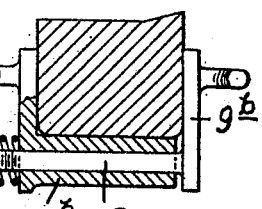
INVENTOR
Fredrick Sievern
By Kay, Totten & Martin
Attorneys Patented Dec. 1, 1925.

1,563,666

UNITED STATES PATENT OFFICE.

FREDRICK SIEVERN, OF McKEESPORT, PENNSYLVANIA.

ANTISKID DEVICE.

Application filed July 2, 1925. Serial No. 41,023.

*To all whom it may concern:*

Be it known that I, FREDRICK SIEVERN, a citizen of the United States, and a resident of McKeesport, in the county of Allegheny and State of Pennsylvania, have invented a new and useful Improvement in Antiskid Devices; and I do hereby declare the following to be a full, clear, and exact description thereof.

My invention relates to anti-skid devices, and particularly to devices which may be placed on automobile wheels and the like, to prevent skidding thereof.

The invention comprises an improvement upon the structure shown in my Patent No. 1,535,551 issued April 28, 1925.

My invention has for its object the provision of means whereby an anti-skid device of the type described in said patent, as well as other types, may be applied to and properly fit wheels having fellies or rims of various sizes.

Some of the forms which my invention may take are shown in the accompanying drawing, wherein Fig. 1 is a portion of an automobile wheel equipped with devices embodying my invention; Fig. 2 is a sectional view, on an enlarged scale, of the structure shown in Fig. 1; Fig. 3 is a side elevational view, on an enlarged scale, of a portion of the structure of Fig. 1; Fig. 4 is a sectional plan view of a portion of an anti-skid device embodying my invention; Fig. 5 is a view similar to Fig. 2, but showing a modified form of device, and Fig. 6 is a similar view showing still another modification.

The device is shown as applied to an automobile tire 7 and comprises metal blocks 8 having a wing portion 9 which is adapted to lie against one side of a wheel felly. The body portion of the block 8 is recessed slightly as indicated at 10 in order that it may partially surround a spoke 11, as shown more clearly in Fig. 4. A slotted extension 12 is provided on the block 8 and a block 13 is slidably supported by said extension. The block 13 corresponds in general outline to the extension 9 and is adapted to engage the outer side of the wheel felly. The block 13 is yieldably held in abutting engagement with the side of the wheel felly, by means of a leaf spring 14 which extends through a perforation in the outer end of the extension 12. The members 9 and 13 are provided with lugs 15 and 16, respectively, which are enlarged at their outer ends so that the end links of the cross chain 17 may be held thereby. The lugs 15 and 16 are of such form that the links may be slipped thereon when given a quarter turn from their parallel alignment with the other links of the tread chain, and locked in position thereon by returning them to their normal position. Other forms of fastening means, such as that shown in my patent above referred to, may be employed for connecting the tread chains to the blocks.

Each anti-skid unit comprises, in addition to a pair of tread chains 17, a pair of blocks 8 and their associated parts, as above described. Each pair of blocks is connected to one end of a spring 18, preferably by threaded engagement therewith, as indicated at 19 in Figs. 2 and 3.

In Fig. 5 I show a structure similar to that of Figs. 1 to 4, but wherein a coil spring 14$^a$ is substituted for the leaf spring 14 of Fig. 2. This coil spring is held in position by a washer 20 and a pin 21 so that the members 9$^a$ and 13$^a$ of the block will be held in snug engagement with the sides of the wheel felly.

In Fig. 6 I have shown a form wherein a member 13$^b$ is provided with a perforated body portion through which the stem 22 of the block 9$^b$ extends. In this case the spring surrounds the outer end of the stem 22 and is held in place thereon by a nut 23 and a washer 24. This spring serves to draw the members 13$^b$ and 9$^b$ together as in the case of the members 13$^a$ and 9$^a$.

From the foregoing it will be seen that I provide a structure wherein the tread chains can be readily disengaged from their holding members or the entire structure can be readily removed from the wheel by simply moving the legs of the spring 18 toward one another so that the wheel spokes are disengaged by the recesses 10 of the blocks, and then disengaging one end link of each tread chain, and wherein the units snugly fit the sides of wheel fellies or rims of various thickness, thus preventing rattling and chafing.

It will be understood that the invention may be employed with other forms of anti-skid devices than that shown in the present case, and that means other than the springs 14, 14$^a$, may be provided for varying the distance between the felly-engaging members.

For instance, a plurality of holes may be provided for the pin 21, to permit adjustment of the block 13ª.

I claim as my invention:

1. The combination with a vehicle wheel, of an anti-skid device comprising a yoke having relatively movable parts which are adapted to engage the sides of the felly of a wheel, and a yieldable connecting member holding said parts in engagement with the sides of said felly, the said parts being adapted to support the ends of a tread chain.

2. An anti-skid device comprising a tread chain supporting device having telescoping parts adapted to engage the sides of the felly of a wheel, and means for yieldably holding said parts in contracted position.

3. An anti-skid device for vehicle wheels, comprising two pairs of chain supporting members adapted to lie between adjacent spokes of a wheel, means for effecting yieldable engagement between said pairs of members and spokes of a wheel, and means for causing each of said pairs of members to yieldably engage the sides of the wheel felly.

4. An anti-skid device comprising a pair of tread chain supporting members, a spring interposed therebetween for yieldably holding them in engagement with adjacent faces of wheel spokes, and means for causing each of said members to yieldably engage the sides of a wheel felly.

In testimony whereof I, the said FREDRICK SIEVERN, have hereunto set my hand.

FREDRICK SIEVERN.